United States Patent
Yang et al.

(10) Patent No.: US 8,437,121 B2
(45) Date of Patent: May 7, 2013

(54) PORTABLE ELECTRONIC DEVICE CAPABLE OF ACCEPTING LANYARD STRAP

(75) Inventors: Xin Yang, Shenzhen (CN); Wei Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 189 days.

(21) Appl. No.: 13/166,725

(22) Filed: Jun. 22, 2011

(65) Prior Publication Data

US 2012/0050967 A1    Mar. 1, 2012

(30) Foreign Application Priority Data

Aug. 27, 2010    (CN) .......................... 2010 1 0264779

(51) Int. Cl.
*G06F 1/16*    (2006.01)
(52) U.S. Cl.
USPC ....... 361/679.01; 439/626; 345/169; 248/917
(58) Field of Classification Search .................. 439/331, 439/350, 460, 391, 131, 626, 188; 361/679.01, 361/679.31, 679.6, 679.17, 679.48, 679.33, 361/679.02, 679.58; 345/179, 156, 168, 345/169; 312/223.1, 223.2, 334.7, 330.1, 312/308, 334.19, 221, 246, 325; 248/553, 248/220.22, 551, 602, 162.1, 127, 917, 286.1, 248/122.1; 16/228, 49

See application file for complete search history.

(56) References Cited

U.S. PATENT DOCUMENTS

2006/0141843 A1 * 6/2006 Huang et al. .................. 439/350
2006/0148298 A1 * 7/2006 Nakao et al. .................. 439/331

* cited by examiner

*Primary Examiner* — Hung Duong
(74) *Attorney, Agent, or Firm* — Altis Law Group, Inc.

(57) ABSTRACT

A portable electronic device includes a shell, an actuation member, a latching member, and a transmission member. The shell defines a first hole and a second hole which are linearly arranged with the first hole. The actuation member is received in the first hole and can be operated to move in the first hole. The latching member is partially received in the second hole and can move between a first position in which the latching member is spaced from a boundary of the second hole to allow a lanyard strap to be sleeved on the latching member and a second position in which the latching member contacts the boundary of the second hole to lock the lanyard strap to the shell. The transmission member is driven by the actuation member to move the latching member between the first position and the second position.

20 Claims, 10 Drawing Sheets

PORTABLE ELECTRONIC DEVICE CAPABLE OF ACCEPTING LANYARD STRAP

BACKGROUND

1. Technical Field

The present disclosure relates to electronic devices and, particularly, to a portable electronic device that can accept a lanyard strap.

2. Description of Related Art

Shells of many portable electronic devices define a small hole therethrough to accept lanyard straps. However, it is difficult to get the lanyard strap through the small hole and attach the lanyard strap to the portable electronic device.

Therefore, it is desirable to provide a portable electronic device which can overcome the described limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
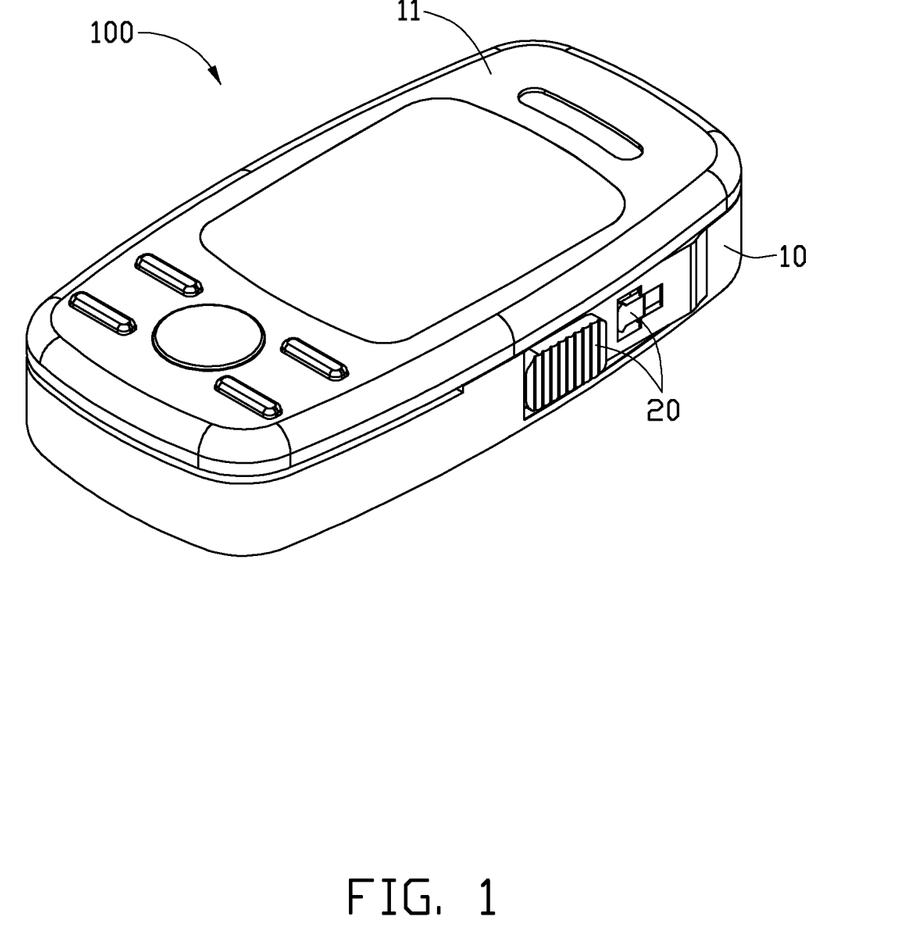
FIG. 1 is an isometric view of a portable electronic device, according to an embodiment.

Referring to FIG. 1, a portable electronic device 100, according to an embodiment, is a mobile phone, but can alternatively be a multimedia player or camera in other embodiments.

Figure 2:
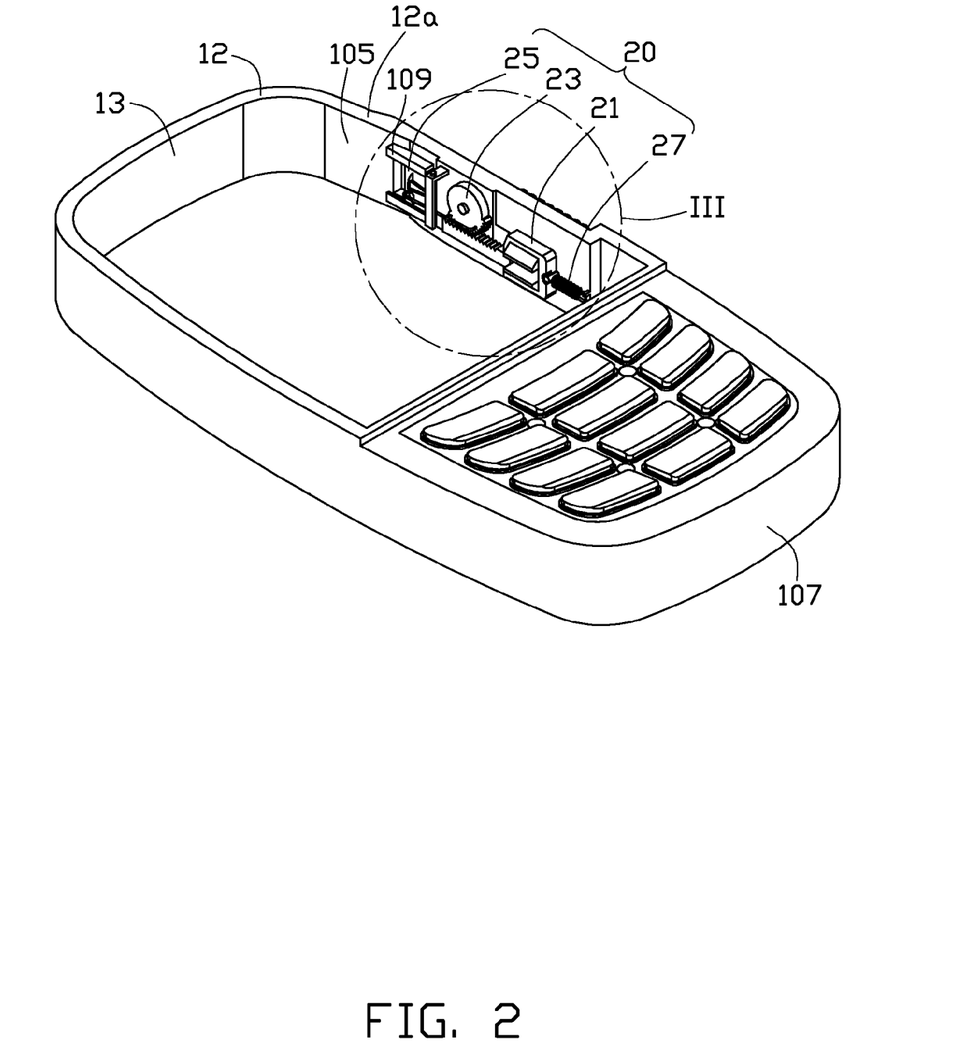
FIG. 2 is an isometric view of the portable electronic device of FIG. 1, wherein a cover of the portable electronic device is absent.

Referring also to FIG. 2, the portable electronic device 100 includes a shell 10 and a lanyard accepting device 20. The shell 10 includes a cover 11 and a bottom frame 12 which cooperatively define a cavity 13 receiving other components of the portable electronic device 100.

Figure 3:
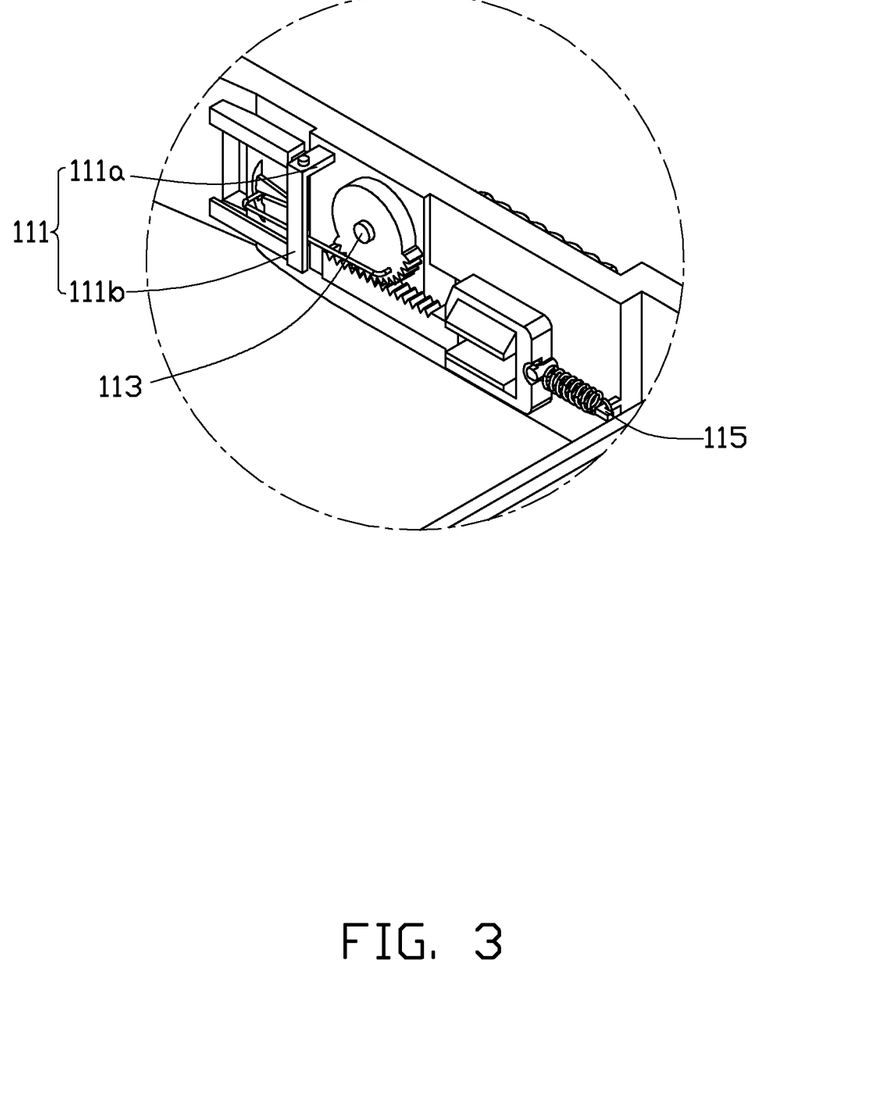
FIG. 3 is an enlarged view of a circled portion III of FIG. 2.
Figure 4:
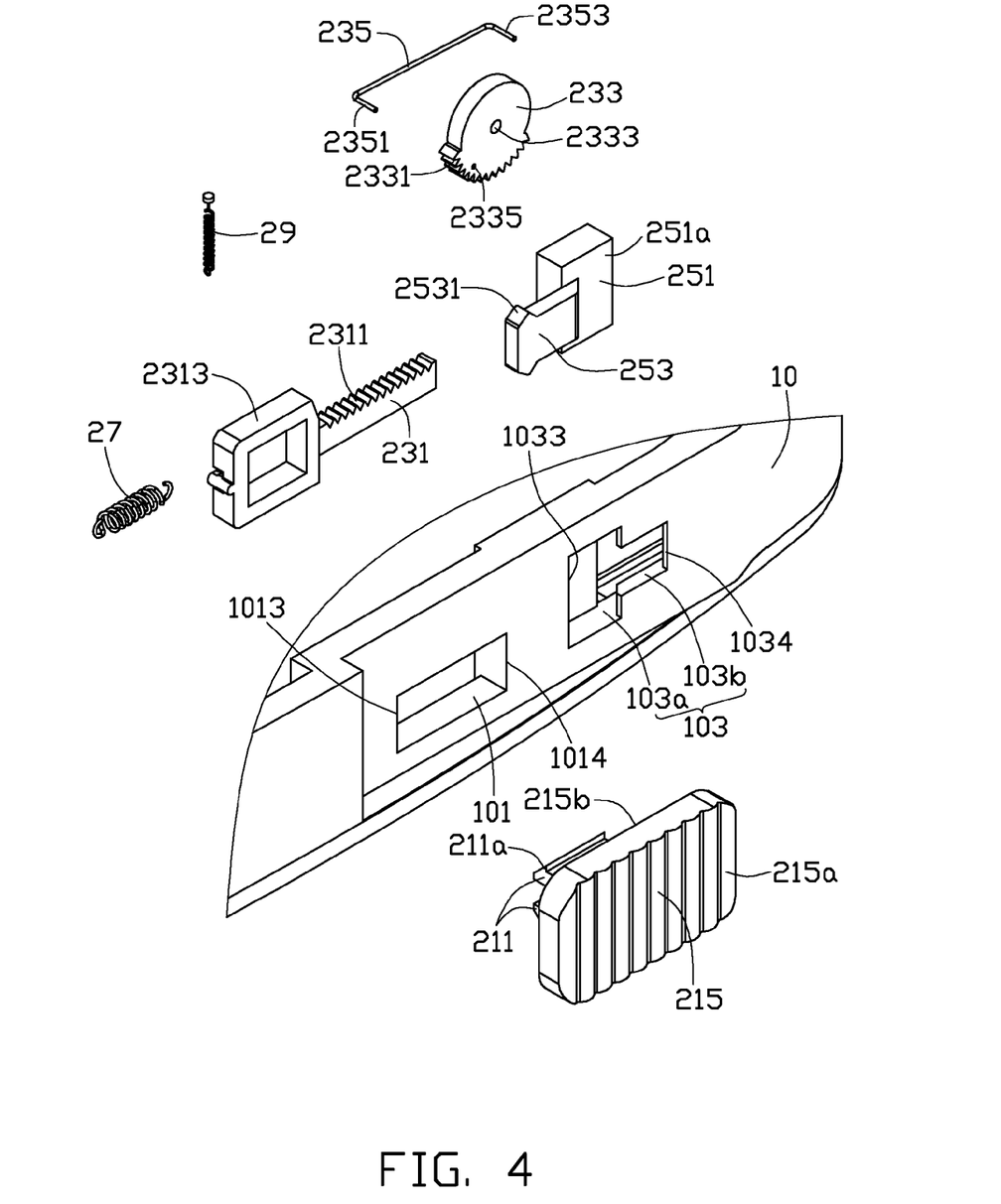
FIG. 4 is an exploded view of a lanyard accepting device of the portable electronic device of FIG. 2.

Also referring to FIGS. 3-4, the bottom frame 12 defines a first hole 101 and a second hole 103 for installing the lanyard accepting device 20 thereon. The first hole 101 and the second hole 103 extend through the inner surface 105 and the outer surface 107 of a right sidewall 12a (viewed in front of the portable electronic device 100 when the portable electronic device 100 is in use) in this embodiment or other sidewall in other embodiments of the bottom frame 12. The first hole 101 and the second hole 103 are arranged in a line substantially parallel to the longitudinal axis of the right sidewall 12a. Both the first hole 101 and the second hole 103 are rectangular and the longitudinal axis thereof is substantially identical to that of the right sidewall 12a. The second hole 103 is divided into a first section 103a adjacent to the first hole 101 and a second section 103b away from the first hole 101. The rails 109 are located at two sides of the second section 103b. The height of the first section 103a (the length of the first section 103a perpendicular to the longitudinal axis of the right sidewall 12a) exceeds that of the second section 103b. However, in other embodiments, the first hole 101 and the second hole 103 can employ other configuration and arrangement depending on requirements.

The bottom frame 12 further includes two rails 109, a cantilever 111, a shaft 113, and a hook 115 protruding from the inner surface 105 of the right sidewall 12a. The rails 109 extend along the longitudinal axis of the right sidewall 12a on two sides of the second hole 103 towards the first hole 101, that is, the upper and bottom sides of the second hole 103. The cantilever 111 and the shaft 113 are located between the first hole 101 and the second hole 103, wherein the cantilever 111 is adjacent to the second hole 103 and the shaft 113 is adjacent to the first hole 101. The cantilever 111 includes a first lever section 111a extending outward from the inner surface 105 and a second lever section 111b depending from an end of the first lever section 111a distant from the inner surface 105. The hook 115 is located at a side of the first hole 101 opposite to the shaft 113.

The lanyard accepting device 20 includes an actuation member 21, a transmission member 23, a latching member 25, a first spring 27, and a second spring 29.

The actuation member 21 includes an operation portion 215 and an engagement portion 211. The operation portion 215 is a block in shape and includes an operation surface 215a and a connection surface 215b opposite to the operation surface 215a. The operation surface 215a defines a number of grooves (not labeled) to facilitate operations thereof, that is pushing. The engagement portion 211 are two engagement sheets uprightly extending upward from the connection surface 215b. The two engagement sheets 211 are generally located at the center of the connection surface 215b and both substantially parallel to the longitudinal axis of the operation portion 215. Each engagement sheet 211 forms a hook portion 211a at an end thereof distant from the operation portion 215. The length of the engagement sheets 211a along the longitudinal axis of the operation portion 215 is less than that of the first hole 101.

The transmission member 23 includes a rack element 231, a gear element 233, and a wire element 235. The rack element 231 includes a receiving portion 2313 and a toothed rack 2311. The receiving portion 2313 is a frame that can be fittingly received by the engagement sheets 211 and engaged by the hook portions 211a. The rack 2311 extends outward from the receiving portion 2313, generally at the center of a side surface of the receiving portion 2313. The gear element 233 is substantially a wheel gear in shape and includes a toothed section 2331 and defines a shaft hole 2333 therethrough generally at the center thereof and a wire-receiving hole 2335 therethrough adjacent to an end of the toothed section 2331. The wire element 235 is a straight wire having two bent distal sections functioning as two hook sections 2351 and 2353.

The latching member 25 includes a sliding block 251 and a tongue 253 extending outward from a side of the sliding block 251. The sliding block 251 is shaped so as to be fittingly slidable on the rails 109 and includes a first surface 251a and a second surface 251b opposite to the first surface 251a. The tongue 253 protrudes from a side of the first surface 251a along the longitudinal axis of the sliding block 251. The width of the tongue 253 is smaller than the height of the second section 103b.

Figure 5:
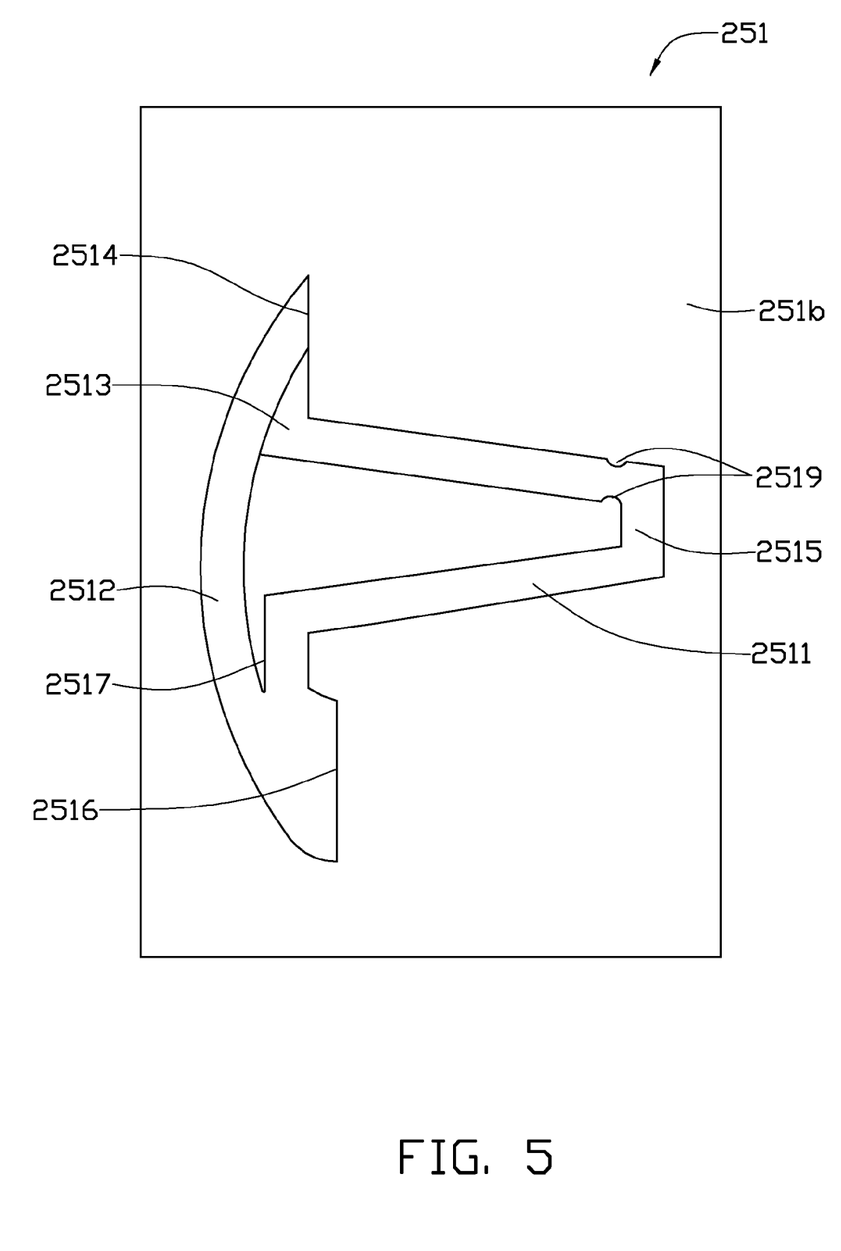
FIG. 5 is a planar view of a sliding block of the lanyard accepting device of FIG. 4.

Referring to FIG. 5, the sliding block 251 defines a first guiding groove 2511 and a second guiding groove 2512 in the second surface 251b. The first guiding groove 2511 is a V-shaped groove having an apex section 2515 adjacent to the tongue 253 and two first ends 2513 far away from the tongue 253. The second guiding groove 2512 is a curved groove that curves away from the first guiding groove 2511 and has two second ends 2514 (the upper one) and 2516 (the lower one) communicating with the first ends 2513. However, the second ends 2514 and 2516 are wider than the first ends 2513. The depth of the second groove 2512 gradually decreases from the second end 2516 to the second end 2514. The sliding block 251 forms a first stop portion 2517. The first stop portion 2517 is a pointed portion at the first end 2513 and points to the second end 2516. The sliding block 251 also forms a second stop portion 2519 that is a bulge portion bulging upward from an end of the apex section 2515 adjacent to the first upper end 2513.

Referring back to FIGS. 2-3, in assembly, the gear element 233 is mounted to the inner surface 105 in a manner that the shaft 113 is received in the shaft hole 2333. Thus, the gear element 233 is rotatably attached to the right sidewall 12a.

The rack element 231 is mounted to the inner surface 105 so that the rack 2311 engages the toothed section 2331 and the receiving portion 2313 is aligned with the first hole 101. Then, the engagement sheets 211 are received in the first hole 101 and the receiving portion 2313 and engages with the receiving portion 2313 by the hook portions 211a. Thus, the actuation member 21 is attached to the right sidewall 12a and can slide between a first boundary 1013 of the first hole 101 far away from the second hole 103 and a second boundary 1014 of the first hole 101 adjacent to the second hole 103 by operating the operation portion 215, that is pushing the operation surface 215a).

The sliding block 251 slides into the rails 109 in a manner that the first surface 251a faces the right sidewall 12a and the tongue 253 is movable in the second hole 103. Thus, the latching member 25 is installed to the right sidewall 12a and the sliding block 251 can slide on the rails 109 from a third boundary 1034 of the second hole 103 far away from the first hole 101 toward a fourth boundary 1033 of the second hole 103 adjacent to the first hole 101 until the tongue 253 is stopped by the fourth boundary 1033.

The wire element 235 connects the gear element 233 and the sliding block 251 in a manner that the hook sections 2351 and 2353 respective hook with the wire-receiving hole 2335 and the first guiding groove 2511, stopped by the first stop portion 2517. Also, the wire element 235 is pushed to the inner surface 105 by the second lever section 111b.

The first spring 27 connects the hook 115 and the receiving portion 2313 and is stretched. The second spring 29 connects the first lever section 111a and the wire element 235 and is stretched.

Figure 6:
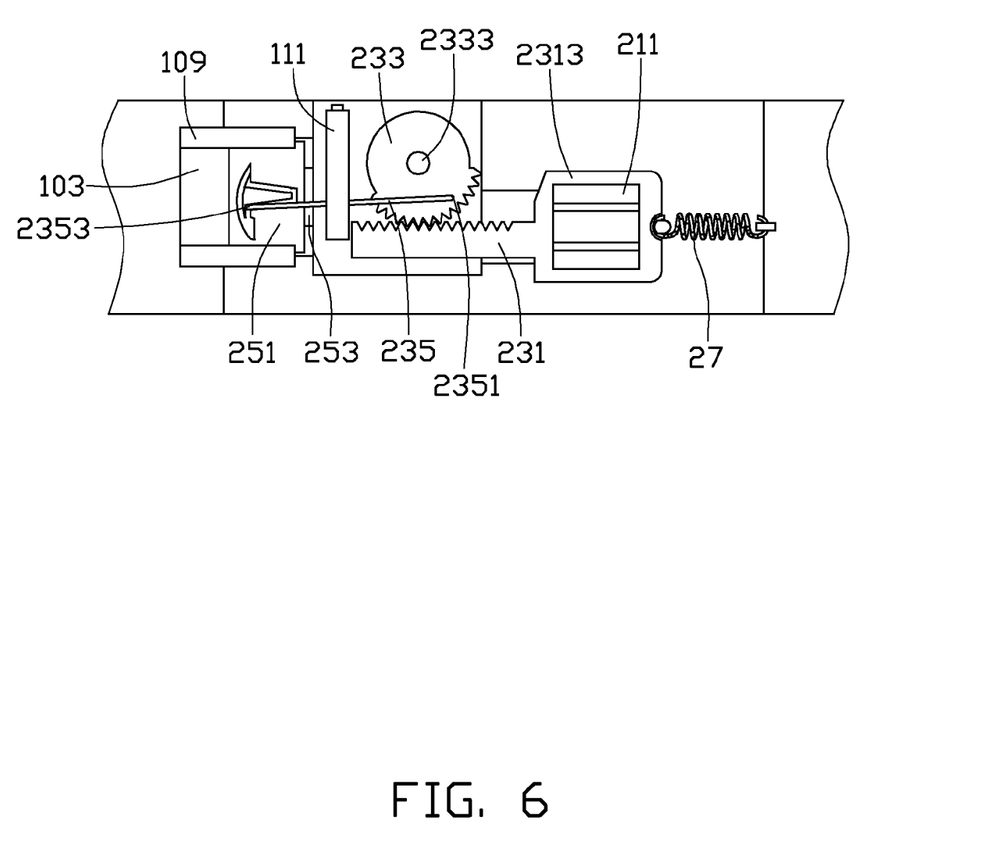
FIG. 6 is a planar view of the lanyard accepting device of FIG. 4 in a first state.

Referring to FIG. 6, in operation, before the operation portion 215 is operated, the engagement portion 211 is pulled to be stopped by the first boundary 1013 of the first hole 101 and the tongue 253 is stopped by the fourth boundary 1033. Thus, a lanyard strap (not shown) can not be wrapped around the tongue 253 to be tied to the tongue 253. In this case, the latching member 25 is at a lock position.

Figure 7:
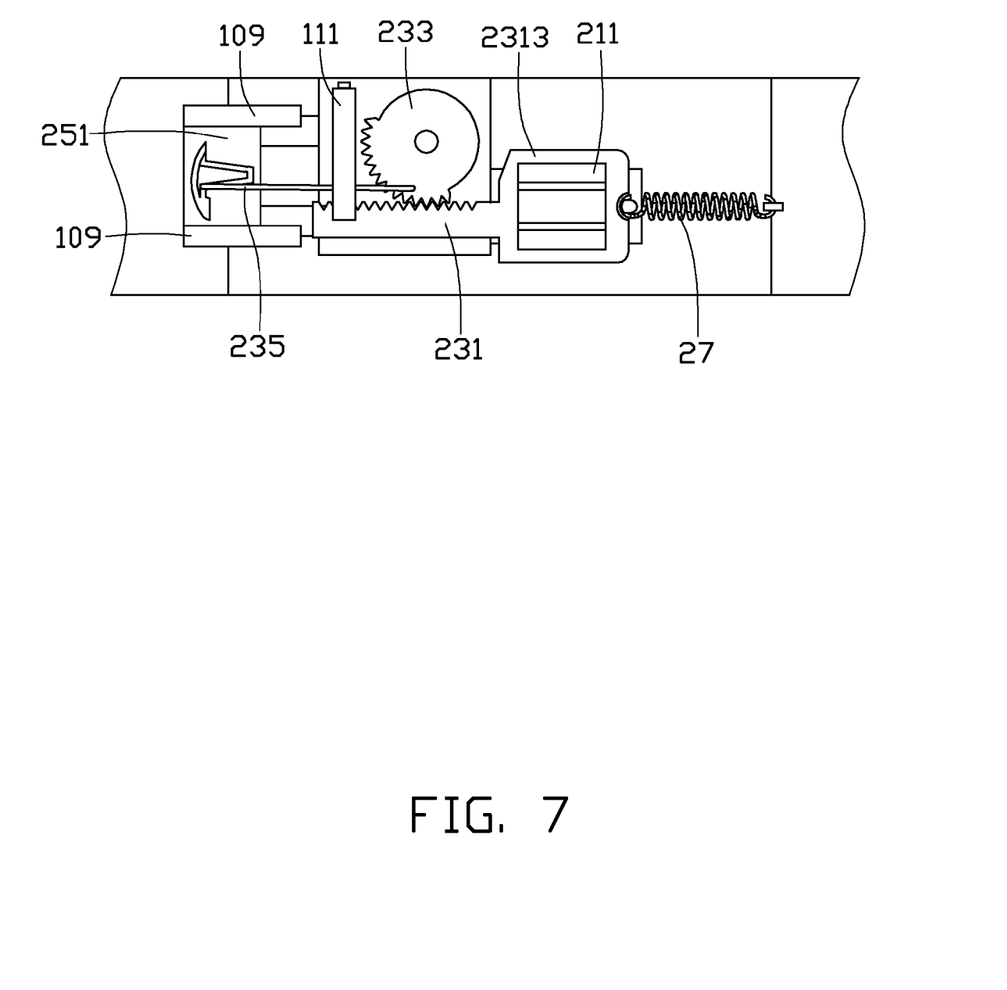
FIG. 7 is similar to FIG. 6 but showing the lanyard accepting device in a second state.

Referring to FIG. 7, to unlock the latching member 25 to accept the lanyard strap, the operation portion 215 is pushed to move toward the second boundary 1014. Thus, the rack element 231 is forced to move toward the latching member 25 by the actuation member 21. The gear element 233 is driven to rotate toward the latching member 25 due to the engagement between the teeth portion 2331 and the rack 2311. Since the hook section 2353 is stopped by the first stop portion 2517, the wire element 235 can not move in the first guiding groove 2511 or the second guiding groove 2512. Thus, the wire element 235 drives the latching member 25 to move to the third boundary 1034 to unlock the latching member 25. After the tongue 253 leaves the fourth boundary 1033 of the second hole 103, the lanyard strap is sleeved on the tongue 253 from the gap between the tongue 253 and the fourth boundary 1033 of the second hole 103.

Figure 8:
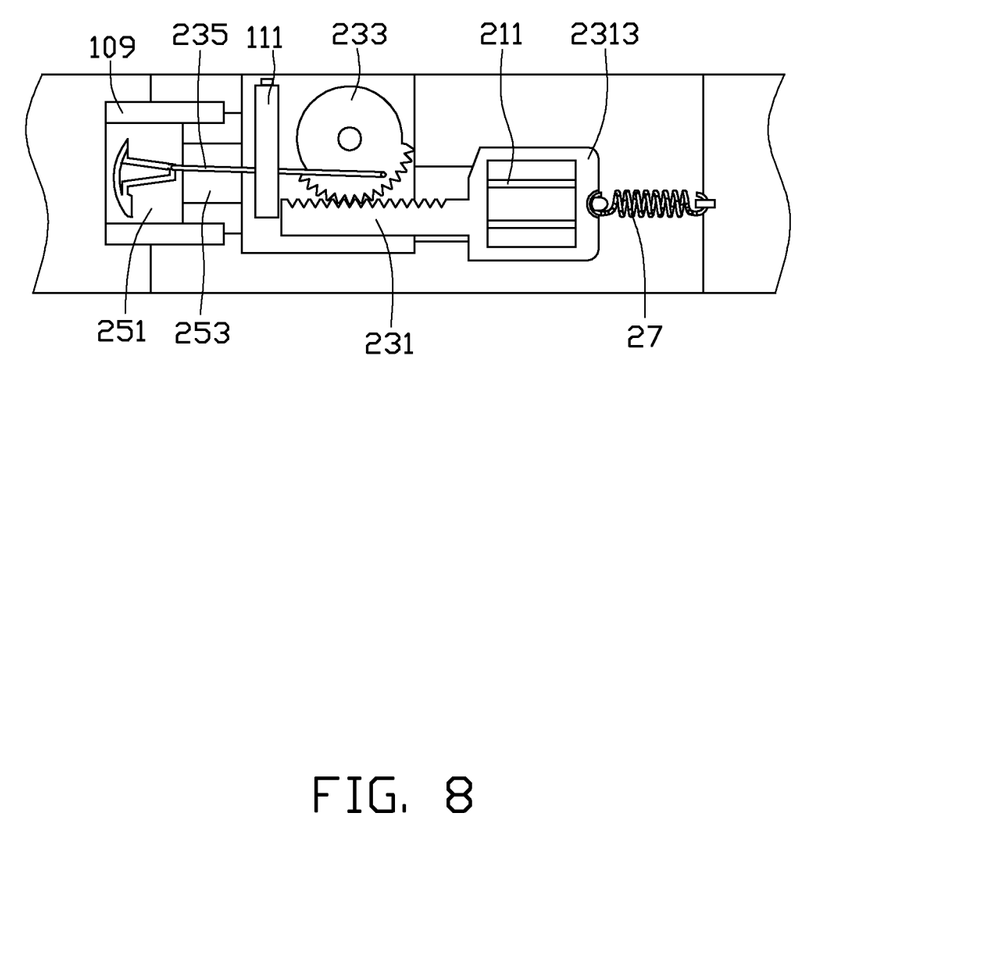
FIG. 8 is similar to FIG. 6 but showing the lanyard accepting device in a third state.

Referring to FIG. 8, after the lanyard strap has been sleeved on the tongue 253. The operation portion 215 is released and thus the rack element 231 is driven to move toward the first boundary 1013 by the first spring 27 until the engagement portion 211 is stopped by the first boundary 1013 again. The gear element 233 is driven to move toward the actuation member 21. Thus, the wire element 235 is pulled by the gear element 233 so that the hook section 2353 slides in the first guiding groove 2511 from the stop portion 2517 to the apex portion 2515 and is stopped by the second stop portion 2519. At this time, the second spring 29 restores to the original state thereof. No force is applied to the wire element 235 and thus the hook section 2353 remains at the second stop portion 2519.

Figure 9:
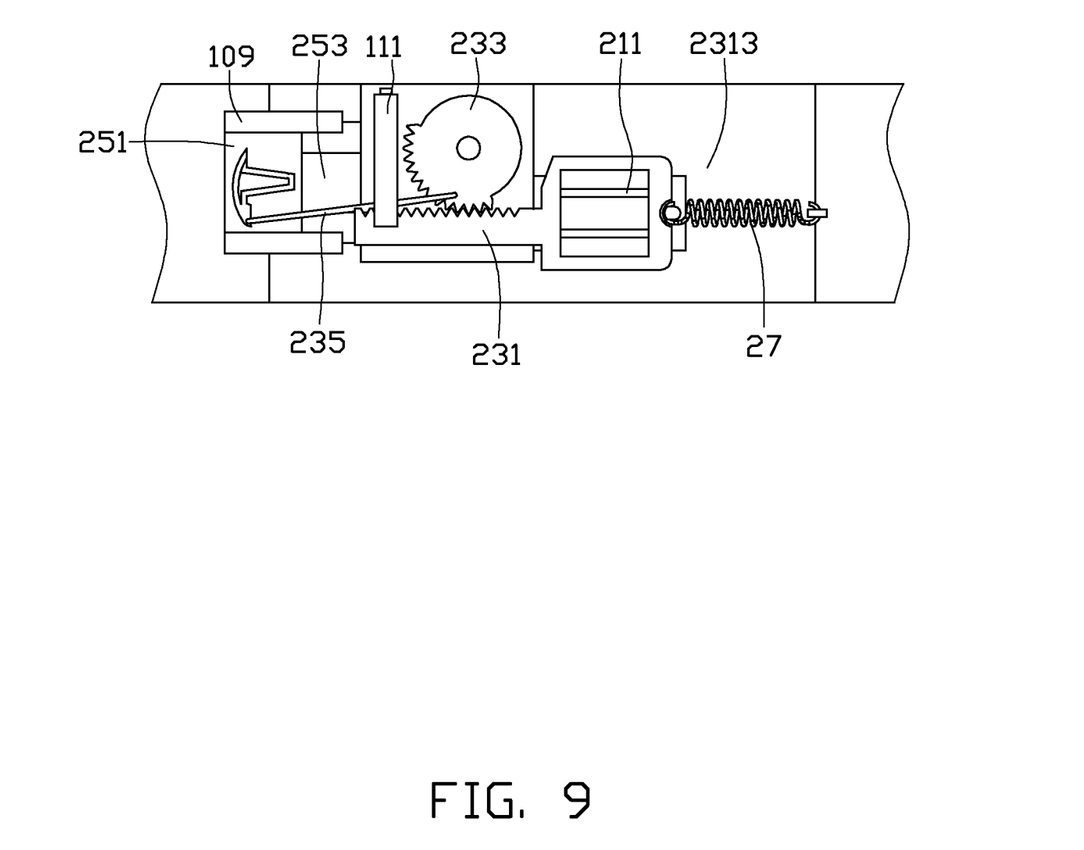
FIG. 9 is similar to FIG. 6 but showing the lanyard accepting device in a fourth state.

Referring to FIG. 9, to lock the latching member 25, the operation portion 215 is pushed toward the second boundary 1014 again. The rack element 231 is forced to move toward the latching member 25 by the actuation member 21. The gear element 233 is driven to rotate toward the latching member 25 due to the engagement between the teeth portion 2331 and the rack 2311. The wire element 235 is pushed by the gear element 233 so that the hook section 2353 moves in the first guiding groove 2511 from the stop portion 2519 to the second end 2514, to the second guiding groove 2512, and to the second end 2516. During the hook section 2353 sliding in the second guiding groove 2512, the hook section 2353 has a trend to move toward the second end 2514 from the second end 2516 due to the pull of the second spring 29. However, since the depth of the second groove 2512 gradually increase from the second end 2514 to the second end 2516, the hook section 2353 is prevented from being drawn back to the second end 2514 by the second spring 29.

Figure 10:
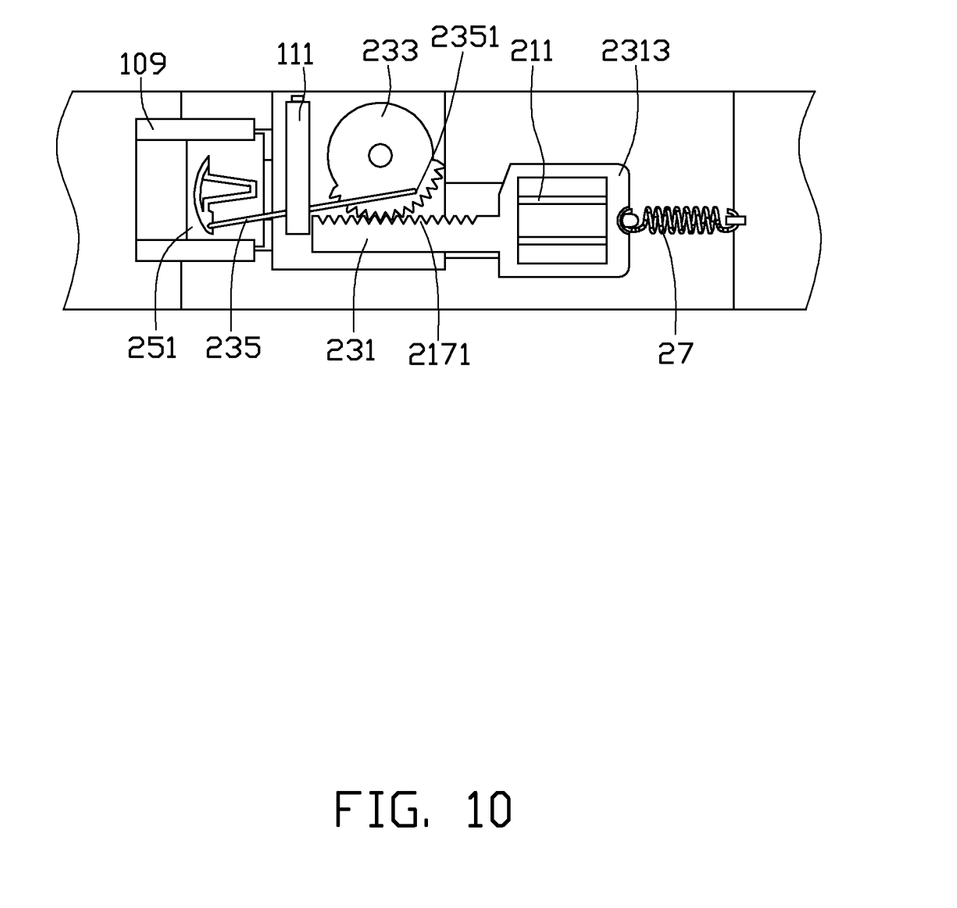
FIG. 10 is similar to FIG. 6 but showing the lanyard accepting device in a fifth state.

Referring to FIG. 10, the operation portion 215 is released. The rack element 231 is driven to move toward the first boundary 1013 by the first spring 27 until the engagement portion 211 is stopped by the first boundary 1013 again. The gear element 233 is driven to move toward the actuation member 21. The wire element 235 pulls the latching member 25 to move toward the fourth boundary 1033 until the tongue 253 is stopped by the fourth boundary 1033 to lock the latching member 25 again. Thus, the lanyard strap is locked in the second hole 103.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A portable electronic device comprising:

a shell comprising a sidewall, two rails, a cantilever, a shaft and a hook, the sidewall defining a first hole and a second hole arranged in a line, the rails, the cantilever, the shaft and the hook protruding from an inner surface of the sidewall, the rails substantially extending along the arrangement direction of the first hole and the second hole and located at two sides of the second hole, the cantilever and the shaft being located between the first hole and the second hole, the cantilever being adjacent to the second hole and comprising a first lever section extending from the inner surface of the sidewall, the hook being located at a side of the first hole opposite to the shaft;

an actuation member comprising an operation portion and an engagement portion extending from the operation portion, the operation position being positioned the outside of the shell, the engagement portion passing through the first hole into the inside of the shell, the engagement portion being capable of sliding in the first hole along a direction parallel to the arrangement direction of the first hole and the second hole;

a latching member comprising a sliding block slidable on the rails and a tongue extending from a side of the sliding block and received in the second hole, the sliding block comprising a surface opposite to the inner surface of the sidewall and defining a first guiding groove and a second guiding groove in the surface, the first guiding groove being V-shaped and having an apex section adjacent to the tongue and a first upper end and a first lower end far away from the tongue, the second guiding groove curving away from the first guiding groove and having a second upper end and a second lower end respectively communicating with the first upper end and the first lower end, the depth of the second groove gradually increasing from the second upper end to the second lower end, the sliding block comprising a first stop portion at the first lower end and a second stop portion at an end of the apex section adjacent to the first upper end;

a transmission member comprising a rack element, a gear element, and a wire element, the rack element comprising a receiving portion engaged with the engagement portion and a toothed rack extending from the receiving portion along the arrangement direction of the first hole and the second hole, the gear element being wheel-shaped, comprising a toothed section meshed with the toothed rack, and defining a shaft hole through which the shaft rotatably inserted and a wire-receiving hole adjacent to an end of the toothed section, the wire element being substantially a straight wire having a first and a second bent distal sections, the first distal section being received in the wire-receiving hole, the second distal section capable of being driven by the gear element to slide in the first and second guiding grooves, the second distal section being configured to resist again the first stop portion to push the sliding block to slide along the rails such that the tongue moves out of the second hole, the second distal section being also configured to hook the second lower end to pull the sliding block to slide along the rails such that the tongue moves in the second hole;

a first spring connecting the receiving portion to the hook and configured for pulling the receiving portion; and a second spring connecting the wire element to the first lever section and configured for pulling the wire element.

2. The portable electronic device of claim 1, wherein the first hole and the second hole are arranged in a line substantially parallel to the lengthwise direction of the sidewall.

3. The portable electronic device of claim 1, wherein both the first hole and the second hole are substantially rectangular, and the lengthwise direction of the first hole and the second hole is generally parallel to that of the sidewall.

4. The portable electronic device of claim 1, wherein the second hole is divided into a first section adjacent to the first hole and a second section away from the first hole, the height of the second section along a direction perpendicular to the arrangement direction of the first hole and the second hole is less than that of the first section, the height of the second section is greater than the width of the tongue, the rails are located at two sides of the second section, the tongue is stopped by a boundary of the first section adjacent to the first hole.

5. The portable electronic device of claim 1, wherein the operation portion comprises operation surface and a connection surface opposite to the operation surface, the operation surface is configured for receiving operations thereon, and the engagement portion extends outward from the connection surface.

6. The portable electronic device of claim 1, wherein the engagement portion comprises two engagement sheets that extend substantially parallel to the lengthwise direction of the operation portion, each engagement sheet comprises a hook portion at an end thereof distant from the operation portion, the receiving portion is a frame, and the engagement sheets insert into the receiving portion and engage with the receiving portion by the hook portions.

7. The portable electronic device of claim 1, wherein the cantilever comprises a second lever section depending from an end of the first lever section, the second lever section presses the wire element towards the inner surface of the sidewall.

8. The portable electronic device of claim 1, wherein the second stop portion is configured to retain the second distal section at an end of the apex section adjacent to the first upper end when the second distal section stops in the apex section and the first spring restores to the original state thereof.

9. The portable electronic device of claim 1, wherein first stop portion is a pointed portion at the first end and points to the second lower end.

10. The portable electronic device of claim 1, wherein the second stop portion is a bulge portion bulging from an end of the apex section adjacent to the first upper end.

11. A portable electronic device, comprising:

a shell comprising a sidewall and defining a first hole and a second hole in the sidewall, the first hole and the second hole being arranged in a line;

an actuation member inserting through the first hole and capable of moving in the first hole;

a latching member partially inserting in the second hole and capable of moving between a first position in which the latching member is spaced from a boundary of the second hole to allow a lanyard strap to be sleeved on the latching member and a second position in which the latching member contacts the boundary of the second hole to lock the lanyard strap to the shell; and a transmission member connected between the actuation member and the latching member and configured for being driven by the actuation member to move the latching member between the first position and the second position.

12. The portable electronic device of claim 11, wherein the first hole and the second hole are arranged in a line substantially parallel to the lengthwise direction of the sidewall.

13. The portable electronic device of claim 12, wherein both the first hole and the second hole are substantially rectangular, and the lengthwise direction of the first hole and the second hole is generally parallel to that of the sidewall.

14. The portable electronic device of claim 11, wherein the actuation member comprises an operation portion and an engagement portion, the operation portion is located outside the shell and configured for allowing operations thereon, the engagement portion extends outward from the operation portion, through the first hole, and into the inside of the shell, the engagement portion is connected to the transmission member.

15. The portable electronic device of claim 14, wherein the operation portion comprises operation surface and a connection surface opposite to the operation surface, the operation surface is configured for receiving the operations thereon, and the engagement portion extends from the connection surface.

16. The portable electronic device of claim 15, wherein the engagement portion comprises two engagement sheets that extend substantially parallel to the lengthwise direction of the operation portion, each engagement sheet comprises a hook portion at an end thereof distant from the operation portion, the transmission member comprises a receiving portion that is a frame, and the engagement sheets insert into the receiving portion and engage with the receiving portion by the hook portions.

17. The portable electronic device of claim 11, wherein the shell comprises two rails protruding from an inner surface of the sidewall and arranged at two sides of the second hole, the latching member comprises a sliding block slidable on the rails and a tongue extending from the sliding block, the tongue is capable of moving between the first position in which the tongue is spaced from the boundary of the second hole and the second position in which the tongue contacts the boundary of the second hole.

18. The portable electronic device of claim 17, wherein the second hole is divided into a first section adjacent to the first hole and a second section away from the first hole, the height of the second section along a direction perpendicular to the arrangement direction of the first hole and the second hole is less than that of the first section, the height of the second section is greater than the width of the tongue, the rails are located at two sides of the second section.

19. The portable electronic device of claim 17, wherein the shell comprises a cantilever, a shaft, and a hook protruding from the inner surface of the sidewall, the rails substantially extend along the arrangement direction of the first hole and the second hole, the cantilever and the shaft are located between the first hole and the second hole, the cantilever is adjacent to the second hole and comprises a first lever section extending from the inner surface of the sidewall, the hook is located at a side of the first hole opposite to the shaft, the sliding block comprises a surface opposite to the shell, the sliding block defines a first guiding groove and a second guiding groove in the surface, the first guiding groove is a V-shaped groove having an apex section adjacent to the tongue, a first upper end and a first lower end, the first upper end and the first lower end are positioned far away from the tongue, the second guiding groove is a curved groove curving away from the first guiding groove and has a second upper end and a second lower respectively communicating with the first upper end and the first lower end, the depth of the second groove gradually increases from the second upper end to the second lower end, the sliding block comprises a first stop portion at the first lower end and a second stop portion at an end of the apex section adjacent to the first upper end, the transmission member comprises a rack element, a gear element, a wire element, a first spring, and a second spring, the rack element comprises a receiving portion engaged with the actuation member and a toothed rack extending from the receiving portion along the arrangement direction of the first hole and the second hole, the gear element is wheel-shaped, comprises a toothed section meshed with the toothed rack and defines a shaft hole through which the shaft rotatably inserted and a wire-receiving hole adjacent to an end of the toothed section, the wire element is substantially a straight wire and has a first and a second bent distal sections, the first distal section is received in the wire-receiving hole, the second distal section is capable of being driven by the gear element to slide in the first and second guiding grooves, the second distal section is configured to resist again the first stop portion to push the sliding block to slide along the rails such that the tongue moves from the second position to the first position, the second distal section is also configured to hook the second lower end to pull the sliding block to slide along the rails such that the tongue moves from the first position to the first position, the first spring connects the receiving portion to the hook and configured for pulling the receiving portion, and the second spring connects the wire element to the first lever section and configured for pulling the wire element.

20. The portable electronic device of claim 19, wherein the cantilever comprises a second lever section depending from an end of the first lever section, the second lever section presses the wire element towards the inner surface of the sidewall.

* * * * *